US006817089B2

(12) United States Patent
Whitehead

(10) Patent No.: US 6,817,089 B2
(45) Date of Patent: Nov. 16, 2004

(54) CONNECTOR RELEASE TOOL

(75) Inventor: Michael L. Whitehead, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 105 days.

(21) Appl. No.: 10/123,400

(22) Filed: Apr. 16, 2002

(65) Prior Publication Data

US 2003/0192173 A1 Oct. 16, 2003

(51) Int. Cl.[7] .................................................. B23P 19/00

(52) U.S. Cl. .......................... 29/764; 29/235; 29/426.6; 29/747; 29/758; 29/762; 254/25; 254/131

(58) Field of Search ....................... 29/764, 235, 426.6, 29/747, 758, 762; 254/25, 131; 7/100, 105

(56) References Cited

U.S. PATENT DOCUMENTS

| | | | | |
|---|---|---|---|---|
| 5,119,547 A | * | 6/1992 | Ii | 29/764 |
| 5,210,934 A | * | 5/1993 | Lenzi et al. | 29/764 |

OTHER PUBLICATIONS

A & E Manufacturing Co. Catalogue, Harness Connector Release Tools, No. 4647, Year 2000, p. 26.*

George W. Auhulita, Invention Disclosure Agreement relating to quick disconnect of electrical connector, Mar. 25, 1989.

Gary Gauthier, Invention Disclosure Agreement relating to removing hard to remove Ford electrical connectors mostly to solenoids and sensors singlehandedly with a hook and squeeze motion, Oct. 23, 1989.

William R. Brendel, Invention Disclosure Agreement relating to disconnecting automotive electrical connectors, Apr. 23, 2001.

A & E Manufacturing Co. Catalog, Harness Connector Release Tool, No. 4647, 2000, p. 26.

A.O.K. Catalog, Clip Remover, No. S5285.

* cited by examiner

*Primary Examiner*—Carl J. Arbes
*Assistant Examiner*—Tim Phan
(74) *Attorney, Agent, or Firm*—Banner & Witcoff, Ltd.

(57) ABSTRACT

A tool for disengaging electrical connectors includes a central body section with disconnecting prongs projecting from the opposite ends thereof. The prongs are offset relative to the plane of the body section but extend in the same direction so that one set of the prongs forms an arcuate surface which facilitates the use of the prongs to disengage connector sections.

4 Claims, 2 Drawing Sheets

CONNECTOR RELEASE TOOL

BACKGROUND OF THE INVENTION

In a principal aspect, the present invention relates to a tool which is useful for effecting disconnection of male and female connectors associated with automotive wiring systems.

Vehicles typically include various connectors for the wires of the electrical wiring system incorporated in the vehicle. Male and female connectors are generally utilized to facilitate manufacture, repair and replacement of parts of the wiring system of a vehicle. The connectors are generally comprised of a male connector and a female connector and typically incorporate a means to insure that the male and female connectors remain engaged or connected to one another under various environmental conditions to insure electrical continuity as well as to avoid contamination, disconnection or short circuiting. Such connection retention is often effected by means of a plate, flange or loop member that extends from one of the connectors for engagement with a stud or pin associated with the compatible connector. The loop member is generally elastomeric so that it may be engaged with the stud member and remain engaged unless flexed to disconnect the loop from the stud. Such loop and retention means for connectors are quite common in most vehicles.

When repairing a vehicle, it is often necessary to effect disconnection of the male connector and female connector of a wiring system. Disconnection requires flexing of the elastomeric loop member so that it may be disengaged from the stud. To effect such flexing, various types of tools have been used for this task, including screwdrivers, as well as special tools which are designed to engage the elastomeric loop, bend the loop and release it from the stud. While such tools and mechanisms have proven to be effective, there has remained the need for an improved tool which is useful, particularly in situations where the connector is located in an inaccessible location making engagement with a tool very difficult. For example, access under the dashboard, in an engine compartment, or a trunk compartment of a vehicle is often restricted. Additionally, such a tool should be universal and useful with respect to multiple types of joined connectors positioned in multiple environments and conditions.

BRIEF DESCRIPTION OF THE INVENTION

Briefly, the invention comprises a tool for disengaging electrical connectors of the type that include a male connector member and a compatible female connector member which together form a connector assembly. Such connector members include a loop or elastomeric flange on one connector which engages with a pin or stud on the other connector so that when the flange or loop is placed over the stud it will remain engaged with the stud unless elastically deformed thereby retaining the connectors joined together as a connector assembly. The tool comprises an elongate, flat plate member having a first end with bifurcated prongs projecting therefrom for engagement under the elastomeric loop or flange member. The tool further includes a second arcuate or curved end with a set of prongs projecting and extending in the same direction as the prongs of the first end. The pair of prongs at each end of the tool are offset in opposite directions on opposite sides of the flat plate member. Cutout sections along the lateral sides of the plate member facilitate manual gripping for movement of the prongs into engagement with an elastomeric loop or flange of a connector. The curved end of the tool defines a surface which may be engaged by a user of the tool to facilitate positioning of the associated set of the prongs into engagement with the connecting elastomeric loop or flange.

Thus, it is an object of the invention to provide an improved tool for engaging and disconnecting male and female connectors of the type typically used in automotive vehicles.

It is a further object of the invention to provide a disconnector tool which is easily gripped and which includes a design feature that enables and facilitates manual movement of the tool to effect disconnection of a male and female automotive connector assembly.

Yet another object of the invention is to provide an automotive disconnect tool which is lightweight, easy to use, economical and useful in restricted access conditions.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
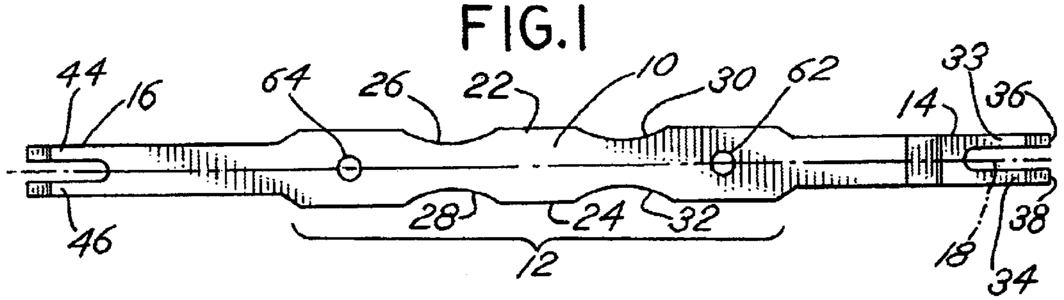
FIG. 1 is a top plan view of the blank form for the tool of the invention.

Referring to the figures, the tool is comprised of a flat, metal plate which is formed in the manner depicted to provide first and second or opposite working ends 14, 16 of the tool. Specifically, a flat plate member 10 includes an intermediate body section 12 having a first working end 14 on opposite or second working end 16. The body section 12 has a longitudinal axis 18 extending between the ends 14 and 16. The plate member 10 is made from flat steel stock, for example, ⅛-inch thick steel. The body section 12 includes first and second generally parallel spaced sides 22 and 24 having arcuate sections 26, 28, 30 and 32 defined or cut therein. The sections 26 and 28 are opposite each other on opposite sides of the longitudinal axis 18. Similarly, cutout sections 30 and 32 are on opposite sides of the axis 18 and are spaced longitudinally from the cutout sections 26 and 28. The tool is approximately eight inches long in its final formed condition. The tool is preferably made from flat steel stock.

Figure 2:
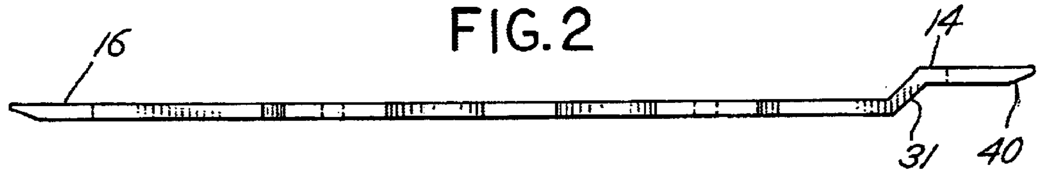
FIG. 2 is a side elevation of the tool of FIG. 1.
Figure 3:
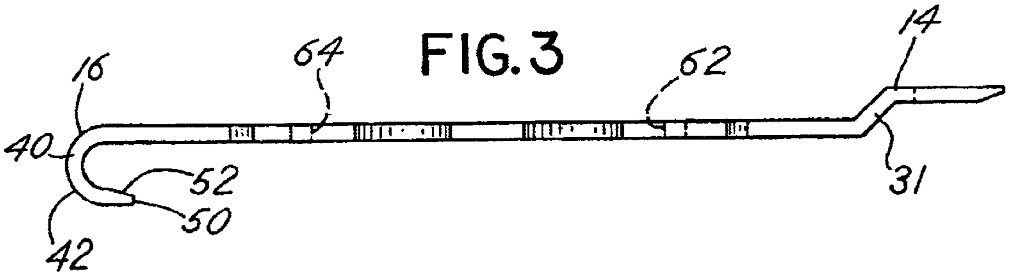
FIG. 3 is a side elevation of the tool of FIG. 2 wherein the plate member forming the tool has been formed into its final configuration or shape.

The first end 14, however, is offset from the plane of the body section 12 as depicted in FIG. 2. The amount of offset of first end 14 is on the order of 3/8 inch and is accomplished by an angled run or section 31 connected from body section 12 to first and second prongs 33 and 34 at the distal, first end 14 of the tool.

The prongs 33 and 34 are spaced in order to fit around a stud or pin and each include leading edges 36 and 38 which define an incline surface or face 40. The incline face 40 forms an angle of about 20° with the plane of the body section 12. The prongs 33 and 34 extend axially in the direction of the axis 18 away from the body section 12.

Second end 16 of the tool is defined by an arcuate or curved section 42 and third and fourth spaced prongs 44 and 46, respectively. The arcuate section 42 has an inside radius on the order of 0.2 inches which results in spacing the prongs of 44 and 46 from the body section 12, approximately the same distance as the first and second prongs 32 and 34 are spaced from the plane of the body section 12, but offset in the opposite direction. Importantly, the arcuate section 42 is a smoothly curved surface which facilitates utilization of the tool.

It is to be noted that the prongs 44 and 46 extend in the same direction as the prongs 33 and 34. The prongs 44 and 46 include a leading edge 50 and an incline surface 52 on the inside of the arcuate shape which, as discussed hereinafter, facilitates utilization of the tool.

Figure 4:
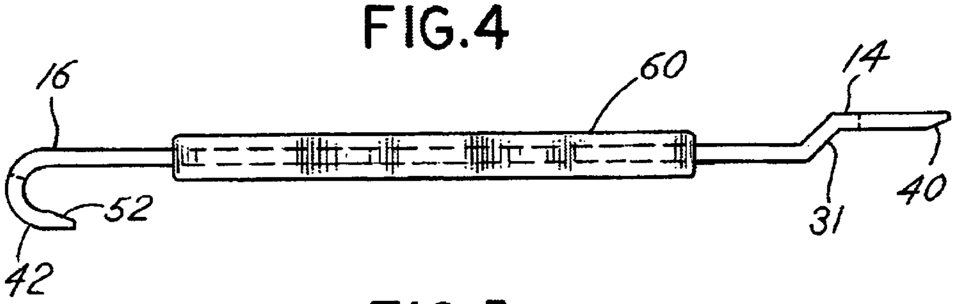
FIG. 4 is a side elevation of the tool of FIG. 3 wherein the main body portion of the tool has been encapsulated in a polyvinyl chloride plastic coating material to facilitate ease of use of the tool.
Figure 5:
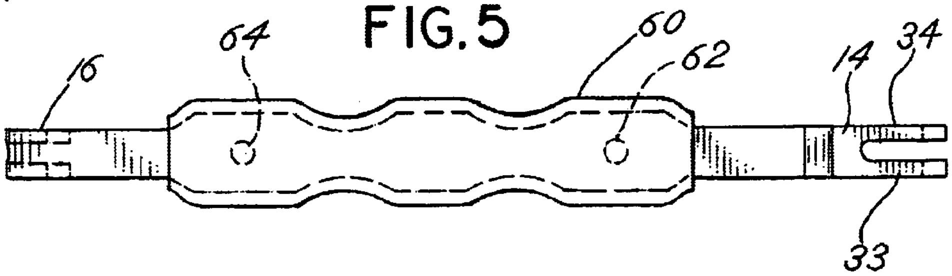
FIG. 5 is a top plan view of the tool of FIG. 4.

As depicted in FIGS. 4 and 5, the body member or section 12, is preferably coated in an elastic or plastic material; namely, a polyvinyl chloride coating 60. The body section 12 includes openings 62 and 64 which facilitate positioning and maintenance of the coating 60 on the body section 12 inasmuch as the coating material 60 passes through and connects through the openings 62 and 64 in the body section 12.

Figure 6:
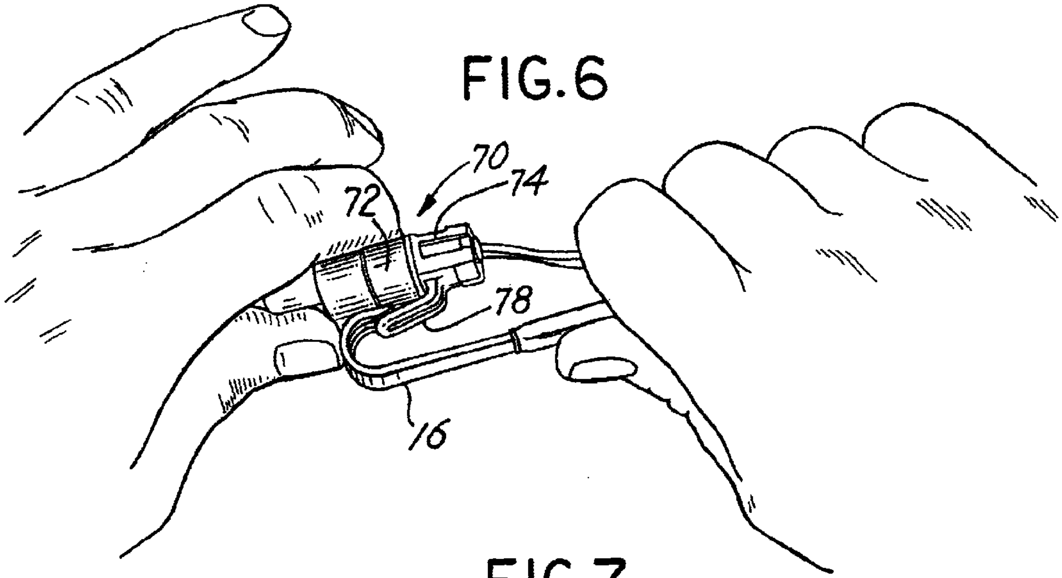
FIG. 6 is an isometric view illustrating the manner of use of the tool, and more particularly, the use of the prongs associated with the curved end of the tool.
Figure 7:
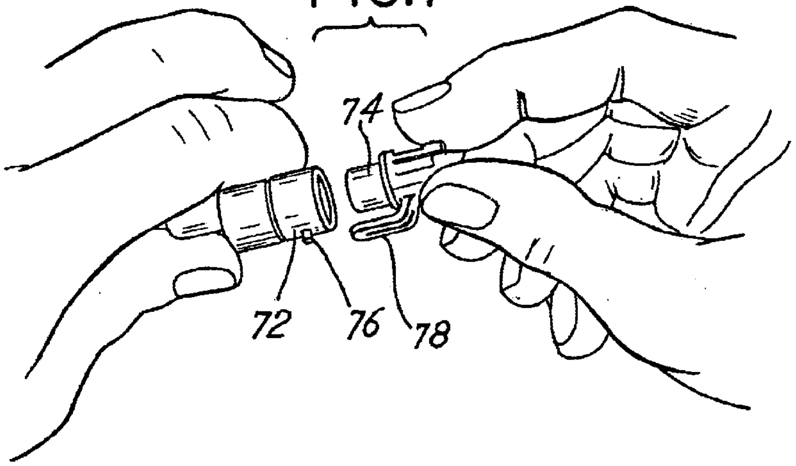
FIG. 7 is an isometric view of the method of use of the tool depicted in FIG. 6 wherein male and female connectors of a vehicle connection assembly have been disconnected by the tool.
Figure 8:
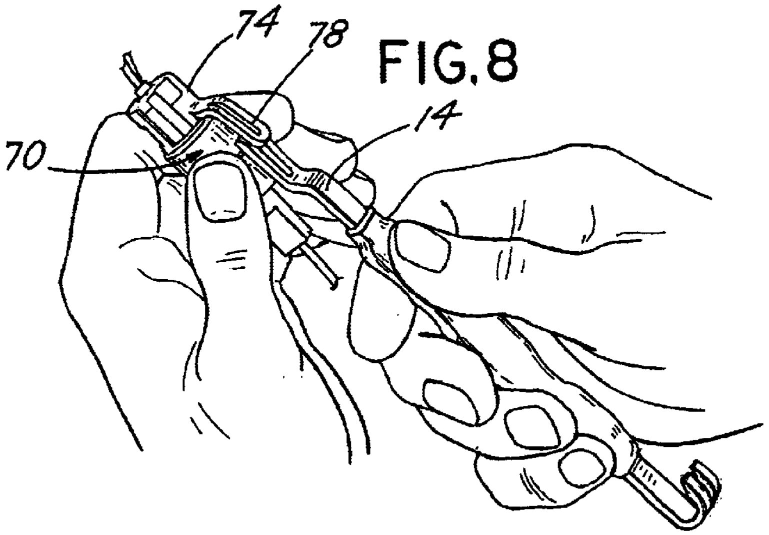
FIG. 8 is an isometric view of the manner of use of the tool depicting the use of the prongs associated with and extending axially from the tool opposite the end of the tool depicted in FIG. 6.

FIGS. 6, 7 and 8 illustrate the manner of utilization of the tool. A connector 70 includes a female element or connector section 72 and a male connector or section 74. A prong 76, or stud 76, is positioned on the side surface of a connector 72. An elastomeric flap, flange or loop 78 is incorporated integrally and molded into the side surface of the other male connector 74. When the flange or loop 78 fits over the stud 76, the connectors 72 and 74 are joined or locked together to define a connector assembly. Disengagement of these sections 72 and 74 may be effected by utilization of the tool as depicted in the Figures.

For example, using the second end 16, a tradesman, as shown in FIG. 6, may position his thumb or other digits against the curved surface 42 thereby forcing the prongs 44, 46 of the second end 16 under the flap, flange or loop 78 and around a pin or stud 76. This elastomerically distorts the loop 78 causing it to rise from the stud or pin 76 thereby enabling the connectors 72 and 74 to be separated. Additionally, by pulling on the tool, the tradesman may use the tool to augment the separation of the connector sections 72 and 74. Also, by lifting or pivoting of the tool, deformation of the flange or loop 78 is effected.

FIG. 6 illustrates the use of the second end 16 of the tool with the prongs 44, 46 associated therewith. FIG. 8 illustrates the utilization of the first end 14 of the tool to effect separation of the connector sections 72 and 74. Note that importantly the prongs 33, 34, 44, 46 extend in the same direction, but are offset from the body section 12. Note also that the curved arcuate section 40 of the second set of prongs 44, 46 may be engaged and pushed to facilitate bending of flange 78 and disconnection of the connector members 72 and 74 regardless of which end of the tool which is used to effect a disconnection operation. Additionally, because the prongs 33, 34, 44, 46 at each end of the tool may be utilized, it is not necessary to use separate tools to effect disconnection. A single tool may be manipulated to effect the desired disconnection. The indentations or sections 26, 28, 30, 32 in the body member 12 help maintain a good grip upon the tool when it is being utilized.

There are various alternative constructions which may be adopted and incorporated in the tool. For example, the amount of offset of the prongs in each direction from the body section 12 may be varied. The size of the arcuate section in the side of the body member 12 may be varied. The number of prongs and inclination of the prongs may be varied. Note that in the preferred embodiment, the prongs include a surface inclined in a manner which facilitates placement of the flat surface of the tool against the side surface of the connector and the inclined surface of the prongs against the underside of the flange, loop or plate 78. Thus, it is to be understood that the invention is to be limited only by the following claims and equivalents thereof.

What is claimed is:

1. A tool for disengaging electrical connectors of the type including a male connector member, a female connector member compatible with the male connector member, said male and female connector members each including an opposed contact face and a side surface transverse to the contact face, an elastomeric retention flange on the side face of one connector member, overlying the side surface of the other member when the connectors are joined, and a retention stud on the side face of the other member said retention flange projecting from one member to engage on the stud of the other member when the connectors are joined, said tool comprising, in combination:

an elongate, flat plate member having a longitudinal axis, a first end and a second opposite end, said plate member being flat between the ends, said first end including first and second spaced prongs, axially projecting from the first end, each prong including a leading edge inclined surface forming an angle with the plane of the flat plate member to facilitate insertion of the prongs under the retention flange and around the stud thereby enabling disengagement of the flange from the stud by lifting the flange from the stud by inserting the prongs under the flange and optionally pivoting the tool about the leading edge to elastically deform the flange and release the flange from the stud, and said second end including spaced axially projecting third and fourth prongs generally parallel to the plate member and formed on an arcuate bend of the plate member, whereby said third and fourth prongs extend toward the first end, said third and fourth prongs each including a leading edge inclined surface forming an angle with the plane of the flat plate member to facilitate insertion of the third and fourth prongs under a retention flange and around a stud thereby enabling disengagement of the loop from the stud by inserting the prongs under the flange and optionally pivoting of the tool to elastically deform the flange and release the flange from the stud, the first and second prongs being generally parallel to and offset from the plate member in a first direction by an angled run from the plate member and the third and fourth prongs being arcuately formed and extending from the plate member in the opposite direction from the first and second prongs by the arcuate bend of the flat plate member and wherein the offsets of the ends of the first and second prongs and third and fourth prongs from the flat plate member are substantially equal.

2. The tool of claim 1 wherein the plate member includes generally parallel side edges extending axially, and further including at least first and second arcuate opposed, cutout sections in said edges for manual gripping of the tool.

3. The tool of claim 2 including two pair of cutout sections in the plate member, each pair spaced longitudinally.

4. The tool of claim 1 wherein at least one inclined surface forms an angle of about 20° with the plane of the plate member.

* * * * *